(No Model.) 5 Sheets—Sheet 2.

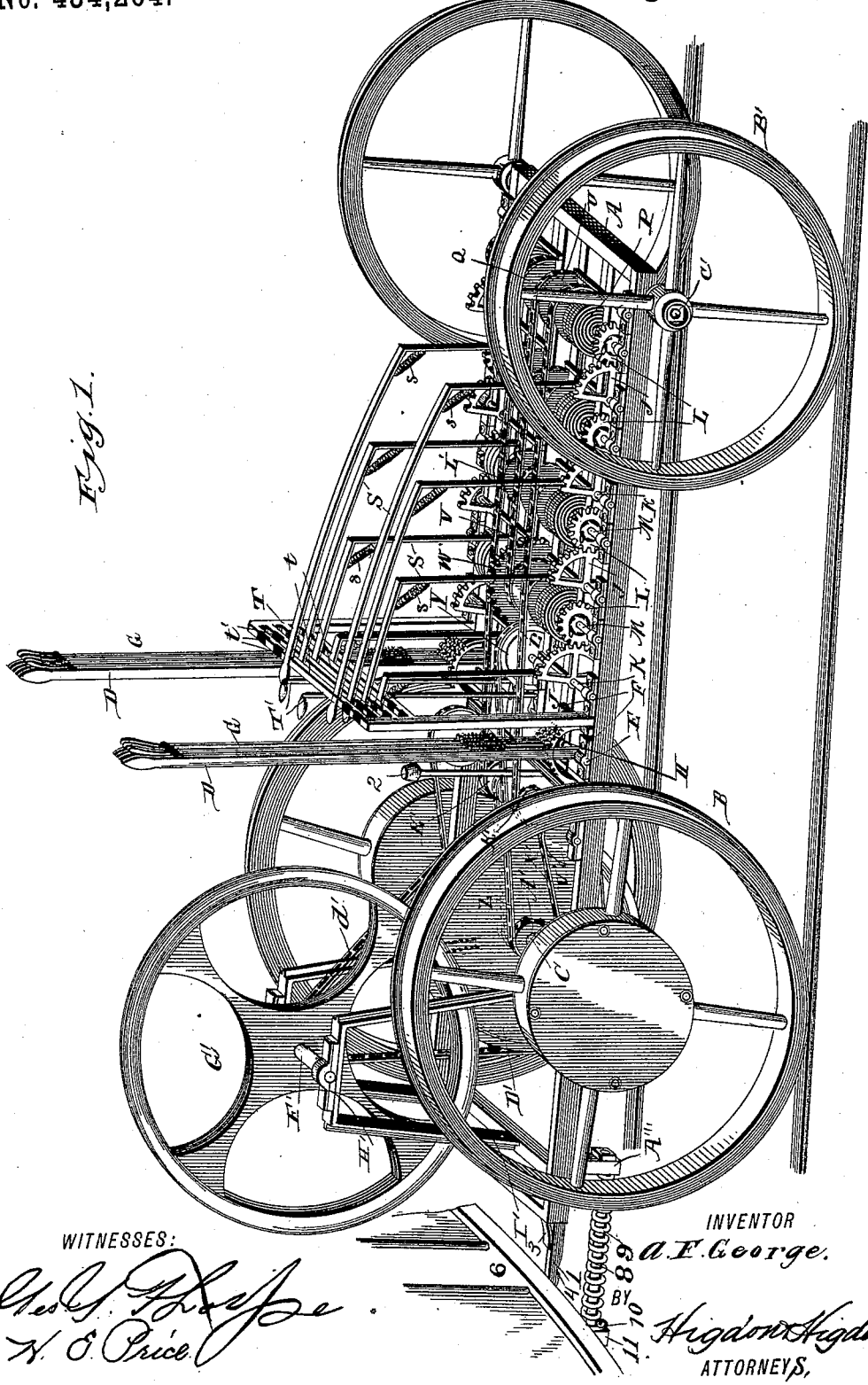

A. F. GEORGE.
SPRING MOTOR FOR CARS.

No. 434,264. Patented Aug. 12, 1890.

WITNESSES:
Geo. J. F. Loppe
H. E. Price

INVENTOR
A. F. George.
By
Heydon Higdon
ATTORNEYS

THE NORRIS PETERS CO., PHOTO-LITHO., WASHINGTON, D. C.

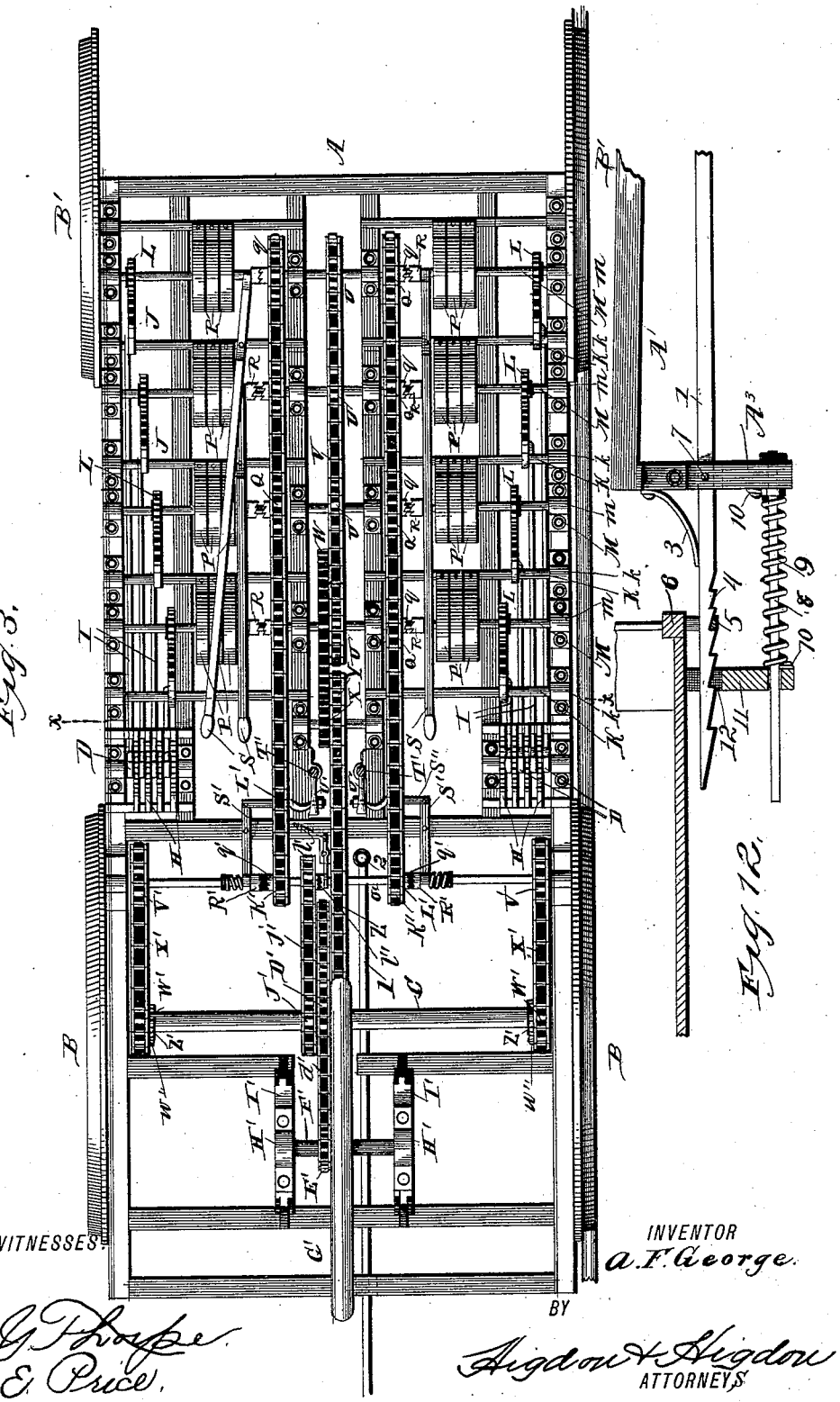

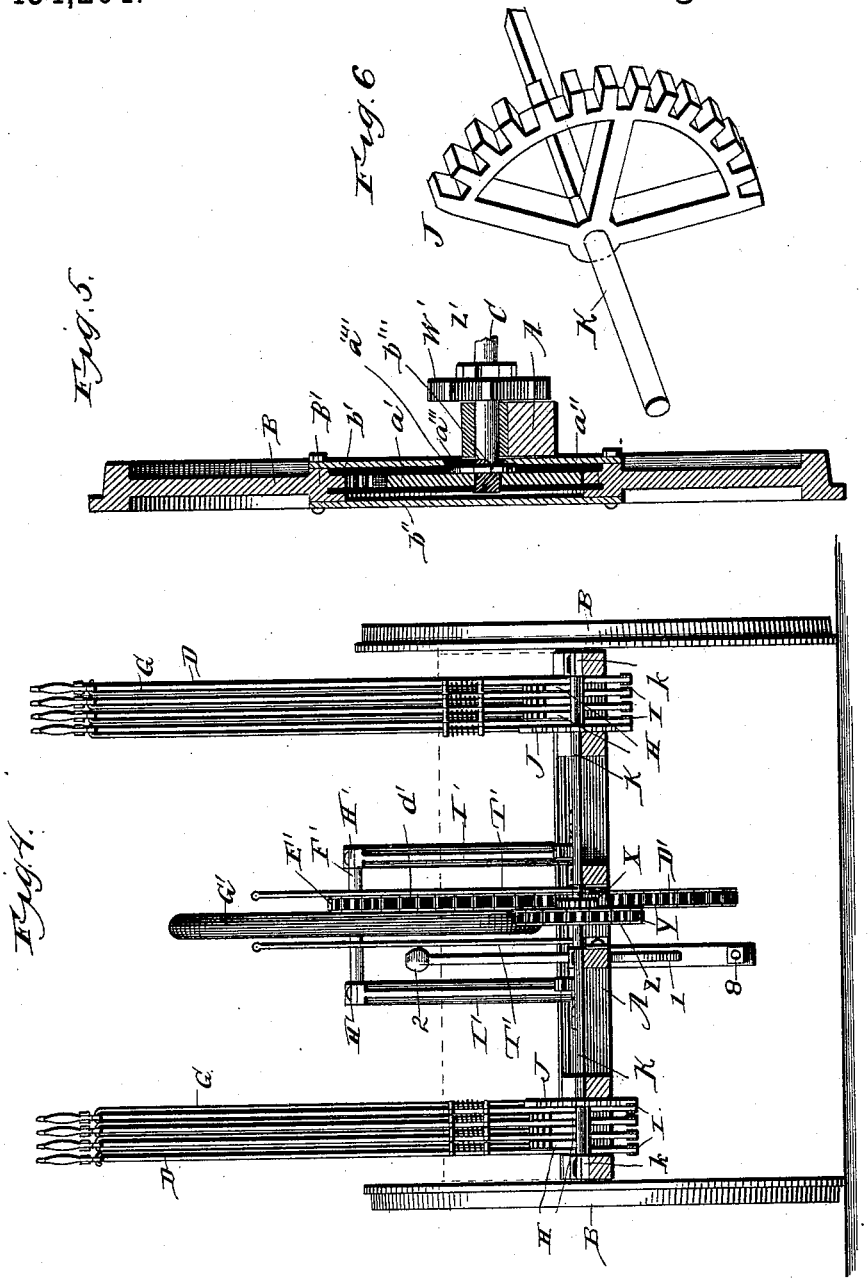

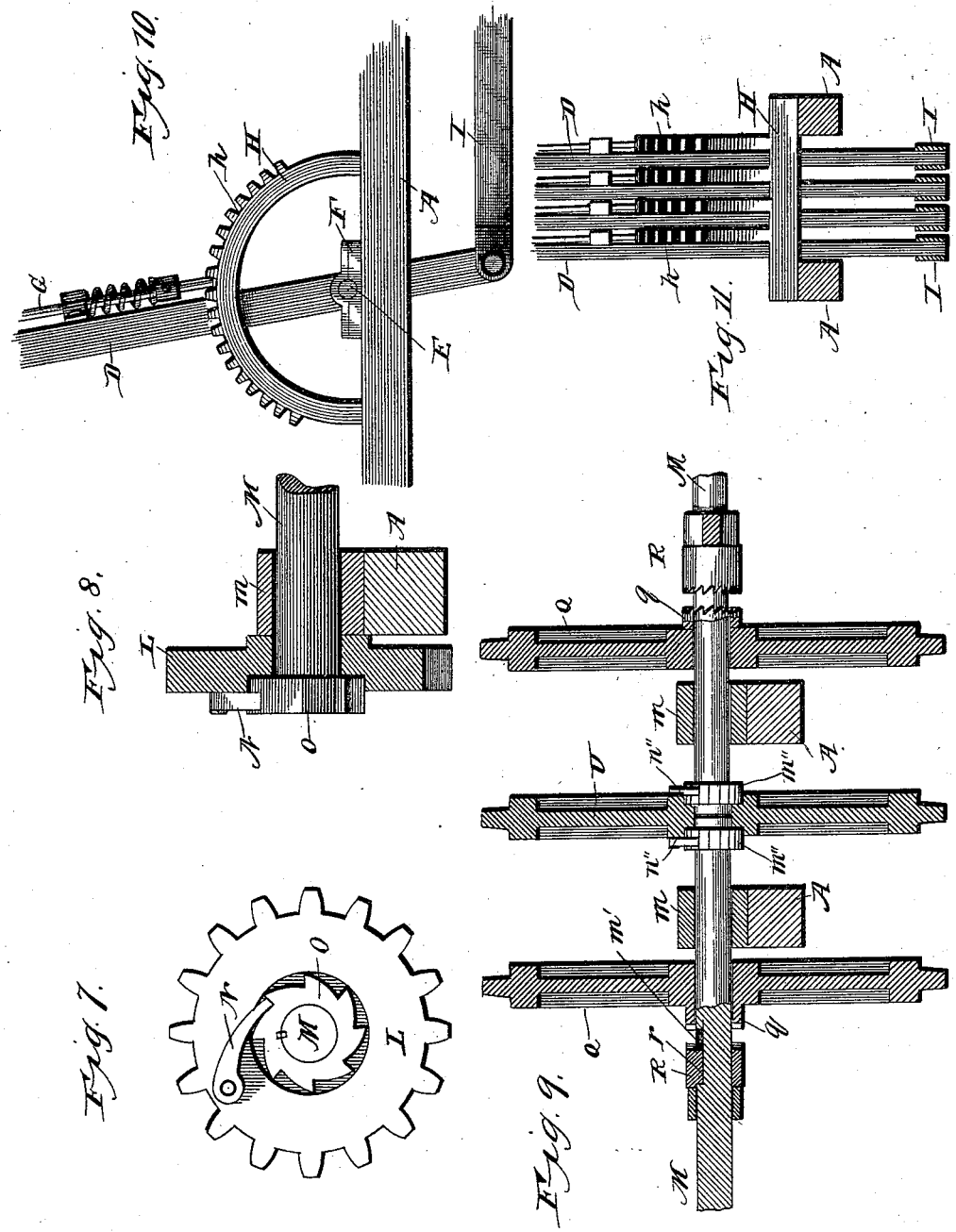

UNITED STATES PATENT OFFICE.

ALBERT F. GEORGE, OF KANSAS CITY, MISSOURI, ASSIGNOR OF ONE-HALF TO GEORGE W. BOZZELL, OF SAME PLACE.

SPRING-MOTOR FOR CARS.

SPECIFICATION forming part of Letters Patent No. 434,264, dated August 12, 1890.

Application filed April 28, 1890. Serial No. 349,788. (No model.)

*To all whom it may concern:*

Be it known that I, ALBERT F. GEORGE, of Kansas City, Jackson county, Missouri, have invented certain new and useful Improvements in Spring-Motors for Street-Railway Cars and other Vehicles, of which the following is a full, clear, and exact description, reference being had to the accompanying drawings, forming a part hereof.

My invention relates to spring-motors for the propulsion of street-railway cars or other vehicles; and it consists in the novel combination of the different parts, hereinafter more fully set forth and described.

Figure 13:
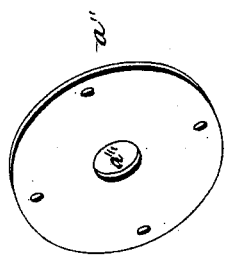
Figure 14:
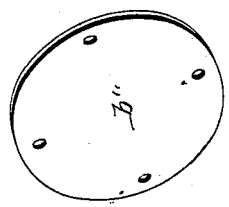
Figure 2:
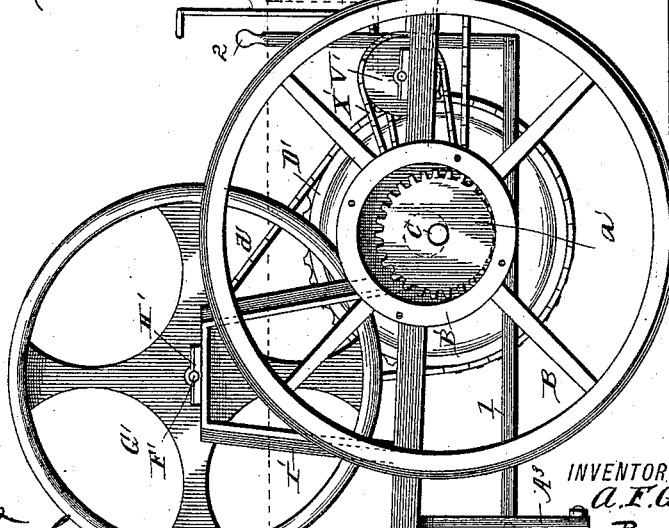

Referring to the drawings, which illustrate the manner in which my invention is constructed and operated, Figure 1 is a perspective view of my invention. Fig. 2 is a side elevation. Fig. 3 is a top plan view. Fig. 4 is a cross-section on line $x\,x$ of Fig. 3. Fig. 5 is a central vertical section of one of the wheels B, showing the operative mechanism inclosed. Fig. 6 is a detail perspective of shaft K, with the rack-segment journaled thereon, and showing the inner ends of the shaft squared, for the purpose hereinafter specified. Fig. 7 is a face view of the cog-wheel L, the ratchet O, keyed on the end of the shaft M, and showing the pawl N, which is pivoted to the cog-wheel L, engaging the teeth of the ratchet O. Fig. 8 is a vertical sectional view of the same. Fig. 9 is a cross-sectional view on line $y\,y$, Fig. 3. Fig. 10 is an enlarged side elevation of the semicircular rack-frame H, showing the connection between the lever D and the pitman I. Fig. 11 is a front view of the same. Fig. 12 shows the connection between the coach and the motor. Fig. 13 is a view of the interior covering-plate of the hub of the driving-wheel, and Fig. 14 is a perspective view of the outside cover-plate therefor.

Referring to the drawings by letter, A represents the frame of the machine; B and B', the wheels; C and C', the axles.

D represents a series of levers, which are pivoted near their lower ends on the shaft E, which are journaled in boxes F, secured to the frame-work A. Dog-rods G are secured by the usual method to the levers D, to engage with the teeth of rack-frames H, which are secured to the frames A. To the lower end of levers D are pivoted the pitmen I, which are secured at their forward ends to the side of the rack-segments J, which are journaled loosely on the outer ends of the shafts K, which rest in boxes $k$, secured to the frame.

The rack-segments J engage with the cog-wheels L, which are journaled loosely on the shafts M, which shafts are journaled in boxes $m$, secured to the frame. The cog-wheels L have recesses in their outer face in which the ratchet-wheels O are placed and keyed to the shafts M.

Pivoted to the outer face of the cog-wheels L are the pawls N, which engage with the ratchets O on the shafts M. Shafts M on either side meet in the center of the machine. Each works independently of the other. On the inner ends of the shaft M are journaled loosely sprocket-wheels U, which are connected by means of a sprocket-chain V. In either face of the sprocket-wheels U a recess is made, into which fits the ratchets $m''$, secured rigidly to the shafts M.

Pivoted on either face of the sprocket-wheel U is a pawl $n''$, which engages with the teeth of the ratchets $m''$. By means of these ratchets and pawls the sprocket-wheels U can be operated with either shaft M independent of the other.

Secured rigidly or cast integral with the rear sprocket-wheel U is a cog-wheel W, which engages with the pinion X, secured on the short shaft $w$, which is supported in boxes secured to the inner beams of the frame A. Secured rigidly with the pinion X is a sprocket-wheel Y, which is connected by means of the sprocket-chain Z to the smaller sprocket-wheel A', which is secured to the axle C.

Journaled on the axle C is a large sprocket-wheel D', which is connected by means of a sprocket-chain $d'$ to the sprocket-wheel E', which is journaled on the axle F' and secured in boxes H' on the upper surface of the framework I'. Journaled also on this shaft F' is the fly-wheel G'. Journaled on axle C are two sprocket-wheels W', which are connected by means of sprocket-chains X' to sprocket-wheels V', journaled on the shaft $o'$.

Secured to the inner face of the sprocket-wheels W' are pawls w''', which engage with the teeth of the ratchets Z', which are secured to the shaft C. Sprocket-wheels K' are journaled loosely on the shaft o', and connected by means of sprocket-chains L' to a series of sprocket-wheels Q, journaled loosely on the shafts M.

Cast integral with the sprocket-wheels Q are sleeves q, with ratchet-teeth in their faces.

R' represents sleeves with ratchet-teeth in their faces to engage with the ratchet-teeth in the faces of the sleeves p of sprocket-wheels Q. These sleeves R have a lug r, which slides in the groove m' in the upper surfaces of the shafts M. Secured rigidly to and coiled round shafts M are barrel-springs P, the outer ends of which are secured permanently to the squared portion of the shafts K, before mentioned. By a lateral motion of the levers S, which levers are pivoted to the squared portion of the shaft K, the forward bifurcated portion of the lever forces the sleeve R into engagement with the sleeve q, and by turning the hand-levers T', which work the sprocket K', the gearing is completed and the power reversed. The sleeves R', with ratchet-face, are forced into engagement with sleeve q' of the sprocket K' by means of the horizontal levers S', which are pivoted to transverse beam of the frame-work A. Pivoted to this lever are links which are secured at their inner ends to the horizontal portion U' of the uprights T', which uprights are journaled at their lower ends in boxes secured to the inner side of the horizontal beams before mentioned.

Secured to the axle C is a sprocket-wheel J', which is connected to the sprocket-wheel l' by means of sprocket-chain j'. This sprocket-wheel has cast integral with it the ratchet-face sleeve, similar in construction to those before mentioned, and is thrown in and out of engagement by means of the lever A'', which forces the lever l'' into engagement with the ratchet-face of sprocket-wheel l'. This lever is pivoted to the cross-beam of the frame A and extends upward within reach of the operator.

The cog-wheels a' are journaled loosely on the ends of the axle C and engage with the teeth of the circular racks b', cast integral with the wheels B. On the inner side of the cogs a' are pivoted pawls a'''', which engage with the teeth of the ratchets b''', keyed on the shaft C. These cogs are held in place by means of the circular plate b'', secured on the outer face of the wheels B. Similar plates a'', with the circular opening a''', are secured on the inner side of the wheels B. This opening is large enough to allow the axle to play in and out of the center of gravity with wheels B.

Secured to the rear end of the frame A is a downward extension or frame-work A''', to the lower end of which a horizontal rod 8 is secured, which passes rearwardly through an extension 11, bolted to the under surface of the passenger-car. Round this rod 8 is coiled a spring 9, the ends 10 of which are secured permanently to the frame-work A''' and the extension 11.

Pivoted to the frame-work A''' is the horizontal rod 1, which is pivoted at its forward end to the vertical rod 2, which passes up through the platform within reach of the operator's foot. The rear end is provided with ratchet-teeth 4 on the lower surface. These teeth 4 engage with the horizontal arm of the U-shaped bracket 5, bolted to the under surface of the car near the front. An opening 12 is made in the extension 11 for the free passage of the bars l. Bolted to the rear of the extension A''' is a leaf-spring 3, which bears on the upper surface of the rod 1.

The operation of my invention is as follows: The operator stands on a platform. (Shown by dotted lines in Fig. 2.) The machine is propelled by means of the barrel-springs P, wound upon shafts M and secured at their outer ends to the shaft K. The levers D as pressed forward throw the rack-segments J out of engagement with the pinions L, which are loosely journaled upon the shaft M, as before stated, the pawl N sliding loosely over the teeth of the ratchet O. Immediately, however, the levers are thrown backward the pawl N engages with the teeth of the ratchet O, which is keyed on the end of the shafts M, thus turning the shafts M and therefore winding the springs. With one movement of the lever in a rearward direction the shaft makes one complete revolution. One or more sets of these springs can be wound at a time, as they each work independently of the other. On the meeting ends of every pair of shafts M is journaled a sprocket-wheel U, which has a ratchet m'' on either side to hold and distribute the power stored up when the springs are wound. These ratchets m'' are engaged by pawls n'' on each side of the sprocket-wheels U, thus allowing the sprocket-wheels U to turn with either shaft independently of the other, or both together, as the operator may desire. Secured rigidly to or cast integral with the rear sprocket-wheel U is a cog-wheel W, which engages with the pinion X. This pinion is secured to or cast with sprocket-wheel Y, which is journaled upon the shaft w', and connected by means of the chain Z to the sprocket A' on the rear axle C. The operator throws the sprocket Q in and out of gear with the shaft M by means of sleeves R sliding on the shaft M and engaging with sleeves q, as before described. These sprockets Q connect with the sprocket-wheels K'', which are thrown in and out of gear by means of the hand levers or rods T'. The sleeves R are thrown into engagement with the sleeves q by means of levers S, which are pivoted to the squared portion of the shafts K. These levers then extend in an upward and a rearward direction, the rear end resting on lateral arms of the frame T, with notches in their upper surfaces. These levers S may be made of spring metal, or may have coiled springs secured to them to nominally depress the rear ends of said levers and hold them in engagement with the notches $t'$ in the upper surface of said transverse bar. The object of thus handling the levers S and T' and throwing in gear the sprockets K'' and Q is for the purpose of rewinding the springs, which reverses the power which is used to propel the machine and cause it to stop. This serves the purpose of a brake, and also regains a portion of the power spent by the use of momentum. In going downgrade new power is stored by reversing the power by means of the levers S and T', therefore serving the purpose of a brake. After the springs have been wound it requires no further effort on the part of the operator, beyond the simple movement of the levers D occasionally, to prevent the springs from unwinding entirely. As the motor stops, the momentum of the coach, which is coupled in the manner described, compresses the spring 9 on the rod 8, and the bracket advances from tooth to tooth on the under side of the bar $l$. These teeth 4 become shorter as the resistance of the spring to the coach increases, and when the coach stops the bracket is held in engagement with one of the teeth 4 by means of the leaf-spring 3, fastened to the rear of the motor and which exerts a continual pressure upon the bar $l$, thus holding the teeth 4 in engagement with the bracket.

When the operator wishes to start, he presses his foot on the knob or enlargement of the rod 2, the lower end of which, being secured to the forward end of the bar $l$, depresses the said end and releases the teeth from engagement with the bracket. The spring being released, its pressure is exerted in favor of the motor, which is considerably lighter than the car and assists in starting the motor. The levers D, or as many of them as may be necessary to start the machine, are thrown forward. This movement disengages the rack-segments J from the cog-wheels L, thus allowing the springs P to exert their power on the sprocket-wheels U, thus conveying power to the axle C.

The object of having the cog-wheels $a'$ journaled loosely on the shaft C and controlled by means of the pawls $a''''$ and ratchets $b'''$ is for the purpose of allowing the outer wheel when turning a curve to move faster than the near wheel.

By placing wheels $a'$ inside of the wheels B, I do seventy-five per cent. of my riding by my weight, or, in other words, the cog-wheels $a'$ being three feet in circumference and the inner surface of the circular rack being one-third greater, the cog-wheel will make one and one-third revolution while the wheel B, which is cast integral with the circular rack $b'$, makes one revolution. Thus wheel B works entirely independent of the machine, with the exception of where the rack $b'$ engages with the cog-wheels $a'$, having no friction whatever.

A circular plate $b''$ is fastened to the outer surface of the wheel B, holding the cog-wheel $a'$ in position. A similar plate $a''$ is bolted to the inner surface of the wheel B, with a circular opening $a'''$ in its center to allow the axle C to play in and out of the center of gravity of the wheel B.

Having thus fully described my invention, what I claim as new, and desire protection in by Letters Patent of the United States, is—

1. In a street-railway motor, the combination of the sprocket-wheels Q and the sleeves R, sliding on the shaft M, as substantially set forth and described.

2. In a street-railway motor, the combination of the sprocket-wheels Q, the chains L', and the sprocket K', secured on the shaft $o'$, and the means of throwing the sprocket-wheels Q and K' in and out of gear with the shafts M and $o'$, as set forth and described.

3. In a street-railway motor, the combination of levers S, the sleeves R, the sleeves $q$ of the sprocket-wheels Q, the hand-levers or rods T', the links S'', and the sleeves S', for the purpose of throwing in gear the sleeves R' with sleeves $q'$ and the sprocket K', as set forth and described.

4. In a street-railway motor, sprocket-wheels U, journaled upon the ends of the two independent aligned shafts M, the pawls $n''$ and ratchets $m''$, and the sprocket-chain V, as set forth and described.

5. In a street-railway motor, the combination of the shafts M, the sprocket-chains V, and the connector with the axle C, through the medium of the cog-wheel W, cast integral with or secured to the rear sprocket-wheel U, engaging with the pinion X of the sprocket-wheel Y, which is connected to the sprocket-wheel A' by means of the chain Z, substantially as set forth and described.

6. In a street-railway motor, the combination of the frame T, secured on the frame A of the motor, with the transverse arms $t$, with notches $t'$ in their upper surface for the engagement of the rear arm of the sleeves S, which are held in place by means of the coiled springs $s$, as set forth and described.

7. In a street-railway motor, the combination of the sprocket-wheels D', secured to the axle C, the sprocket-wheel E', the chain $d'$, and the fly-wheel G', secured to or cast with the sprocket-wheel E', as set forth and described.

8. In a street-railway motor, the combination of the cogs $a'$, journaled loosely on the axle C, the pawls $a''''$, and ratchets $b'''$, with the interior circular rack $b'$, as set forth and described.

9. In a street-railway motor, the combination of the sprocket-wheels W', the axle C, the ratchets Z' and pawls $n''$, the sprocket-wheel V' on the shaft $o'$, and the connecting-chain X', as set forth and described.

10. In a street-railway motor, the combination of the sprocket-wheels J', secured to the axle C, the sprocket-wheel l', with ratchet-sleeve on the inner side, the sleeve l'', sliding on the shaft o', and the lever A'', which operates the same, as set forth and described.

11. In a car-coupling, the combination, with a serrated pivoted bar mounted upon a vehicle, of a spring projecting rearwardly from the said vehicle, and a catch mounted upon a separate vehicle, as described.

12. In a car-coupling, the combination, with a pivoted bar mounted upon the rear part of a vehicle and having teeth on its lower edge, the forward end of the said bar having a vertical rod thereon, of a spring bearing upon the upper surface of the said rod, a spring projecting backward from the said vehicle, and a catch for the said teeth mounted upon a separate vehicle, as described.

In testimony whereof I affix my signature in presence of two witnesses.

ALBERT F. GEORGE.

Witnesses:
GEO. Y. THORPE,
H. E. PRICE.